United States Patent
Ito et al.

[11] Patent Number: 6,051,960
[45] Date of Patent: *Apr. 18, 2000

[54] SWITCHING REGULATOR WITH REDUCED POWER CONSUMPTION

[75] Inventors: Takashi Ito; Misao Furuya, both of Atsugi, Japan

[73] Assignee: Mitsumi Electric Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/922,936

[22] Filed: Sep. 3, 1997

[30] Foreign Application Priority Data

Sep. 20, 1996 [JP] Japan ..................................... 8-250715

[51] Int. Cl.[7] ...................................................... G05F 1/00

[52] U.S. Cl. .......................................... 323/222; 323/284

[58] Field of Search ..................................... 323/222, 284, 323/290; 318/811; 327/131, 137

[56] References Cited

U.S. PATENT DOCUMENTS

| | | | |
|---|---|---|---|
| 4,156,166 | 5/1979 | Shapiro et al. | 315/209 R |
| 4,527,102 | 7/1985 | Gotou | 318/254 |
| 4,536,700 | 8/1985 | Bello et al. | 323/222 |
| 4,682,096 | 7/1987 | Nishijima et al. | 318/808 |
| 4,719,552 | 1/1988 | Albach et al. | 363/44 |
| 5,519,306 | 5/1996 | Itoh et al. | 323/222 |
| 5,644,214 | 7/1997 | Lee | 323/211 |
| 5,831,418 | 11/1998 | Kitagawa | 323/222 |

Primary Examiner—Shawn Riley
Attorney, Agent, or Firm—Ladas & Parry

[57] ABSTRACT

A switching regulator includes an oscillation circuit for generating a triangular waveform signal having a predetermined frequency, a comparator compares the triangular waveform signal generated by the oscillation circuit with a voltage control signal commensurate with a voltage to be output so as to generate a pulse signal which goes high or low depending on a result of the comparison, and a driving circuit for selecting a portion of the triangular waveform signal generated by the oscillation responsive to the pulse signal generated by the comparator, so as to generate the drive signal for driving the switching element.

3 Claims, 4 Drawing Sheets

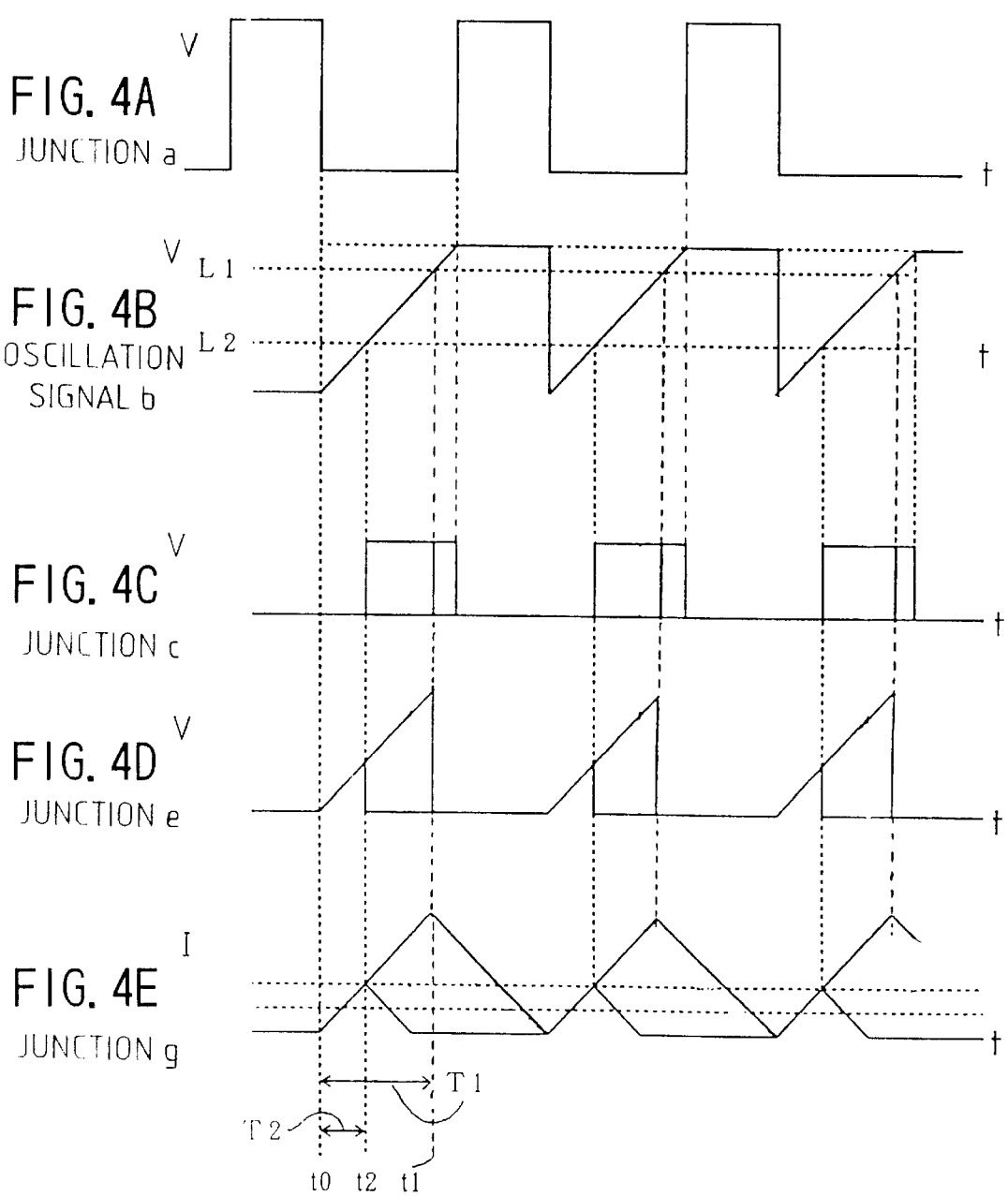

SWITCHING REGULATOR WITH REDUCED POWER CONSUMPTION

BACKGROUND OF THE INVENTION

1. Field of the Invention

The present invention generally relates to switching regulators and, more particularly, to a step-up switching regulator.

2. Description of the Related Art

FIG. 1 is a circuit diagram of a conventional step-up switching regulator 11.

The conventional switching regulator 11 comprises a drive circuit 12 for generating a rectangular drive signal with a duty ratio which varies depending on a voltage to be output, a switching element Q11 switched in accordance with the rectangular drive signal generated by the drive circuit 12, a coil L11 for shaping an output current of the switching element Q11 and for outputting the shaped current, a reverse current blocking diode D11, and a smoothing capacitor C11.

The drive circuit 12 comprises a control circuit 13 for generating a rectangular drive signal with a duty ratio varying in accordance with a level of a voltage control signal, and a driving circuit 14 for driving the switching element Q11 in accordance with the drive signal generated by the control circuit 13.

FIGS. 2A–2C are waveform charts showing an operation of the conventional switching regulator 11. FIG. 2A is a waveform chart of an output of the control circuit 13; FIG. 2B is a waveform chart of an output of the coil L11; and FIG. 2C illustrates a current loss.

The control circuit 13 generates a rectangular signal as shown in FIG. 2A with a high-level period t11 which varies depending on the voltage control signal supplied to the control circuit 13. The control circuit 13 supplies the rectangular signal to the driving circuit 14.

The driving circuit 14 subjects the rectangular signal supplied by the control circuit 13 as shown in FIG. 2A to voltage-current conversion. The driving circuit 14 supplies the converted signal to the base of the NPN transistor Q11 constituting the switching element. The NPN transistor Q11 is driven by the rectangular drive signal as shown in FIG. 2A so as to control a voltage applied to the coil L11.

As shown in FIG. 2B, the coil L11 outputs an output current $I_{pk}$ which rises linearly in the high-level period of the rectangular waveform as shown in FIG. 2A and falls linearly in a low-level period thereof. The output current $I_{pk}$ is output at an output terminal $T_{OUT}$ via the diode D11. The capacitor C11 is connected to the output terminal $T_{OUT}$ so that the triangular waveform as shown in FIG. 2B is smoothed and output as a dc output voltage.

As described above, in the conventional step-up switching regulator, the rectangular waveform as shown in FIG. 2A with a duty ratio which varies depending on the voltage to be output is supplied to the base of the switching element for controlling the current flowing through the coil. As shown in FIG. 2B, the output current $I_{pk}$ of the coil varies such that it rises linearly while the switch is on and falls linearly while the switch is off. Therefore, current portions indicated by hatched areas in FIG. 2C are lost, thus increasing current consumption.

SUMMARY OF THE INVENTION

Accordingly, an object of the present invention is to provide a switching regulator in which the aforementioned problem is eliminated.

Another and more specific object of the present invention is to provide a switching regulator in which current loss is reduced.

In order to achieve the aforementioned objects, the present invention provides a switching regulator comprising: a coil for controlling an output current: a drive circuit for generating a drive signal commensurate with an output voltage; and a switching element switched in accordance with the drive signal so as to control a voltage applied to the coil, wherein the drive signal generated by the drive circuit has a triangular waveform.

The drive circuit may comprise: an oscillation circuit for generating a triangular waveform signal having a predetermined frequency; comparing means for comparing the triangular waveform signal generated by the oscillation circuit with a voltage control signal commensurate with a voltage to be output so as to generate a pulse signal which goes high or low depending on a result of comparison; and a driving circuit for selecting a portion of the triangular waveform signal generated by the oscillation responsive to the pulse signal generated by the comparing means, so as to generate the drive signal for driving the switching element.

The drive signal according to the present invention is triangular which is substantially identical to the waveform of an output current smoothed by the coil. In this way, it is possible to reduce current loss in the drive circuit so that power consumption is reduced.

BRIEF DESCRIPTION OF THE DRAWINGS

Other objects and further features of the present invention will be apparent from the detailed description when read in conjunction with the accompanying drawings, in which:

FIGS. 4A–4E are waveform charts according to the embodiment of the present invention.

DESCRIPTION OF THE PREFERRED EMBODIMENTS

Figure 1:
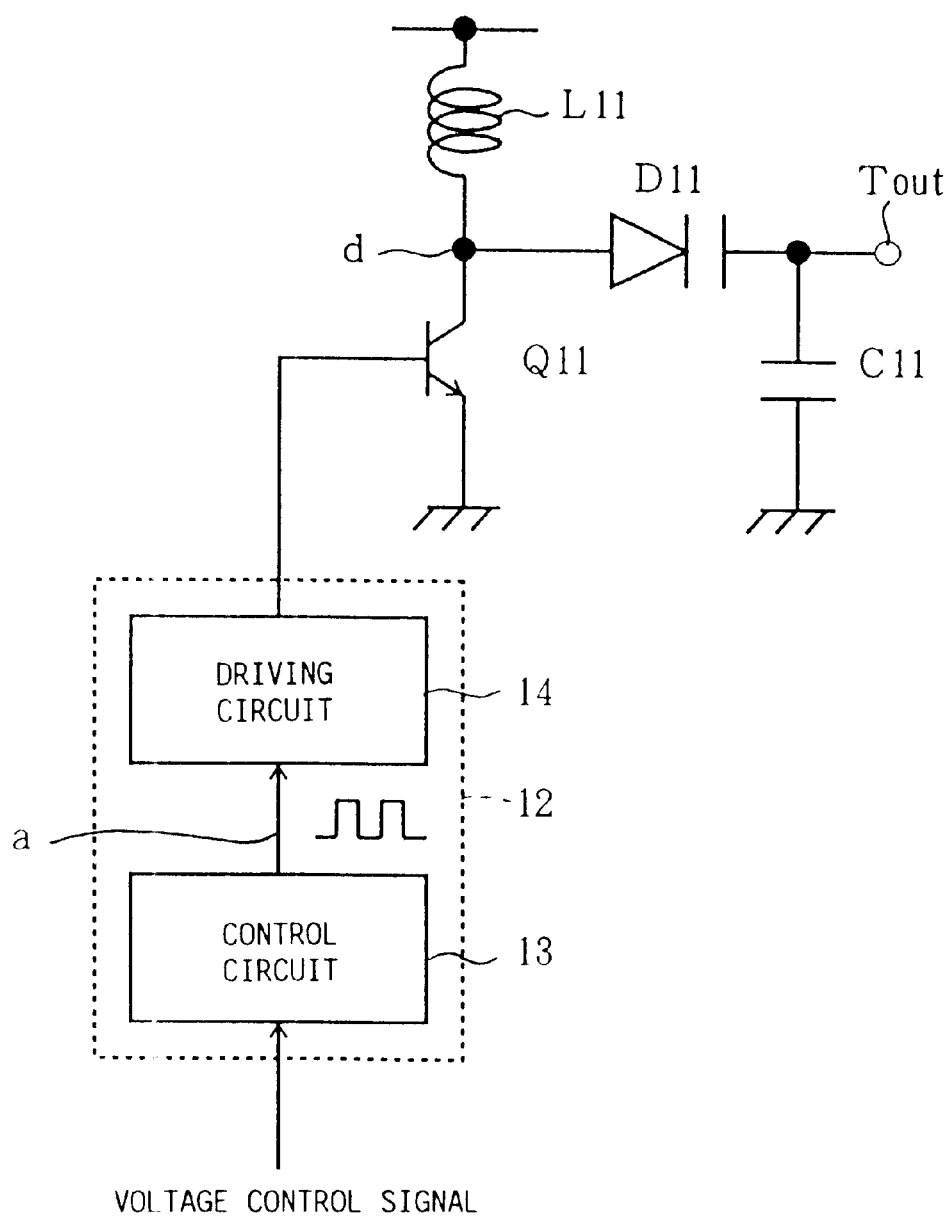
FIG. 1 is a circuit diagram of a conventional step-up switching regulator.
Figure 2A:
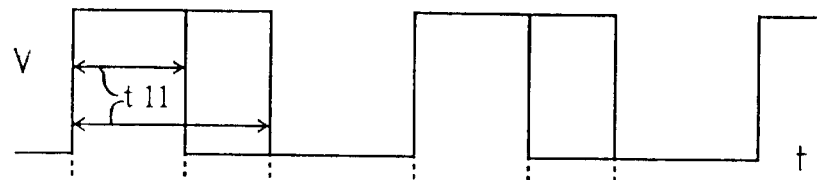
FIGS. 2A–2C are waveform charts showing an operation of the conventional switching regulator of FIG. 1.
Figure 2B:
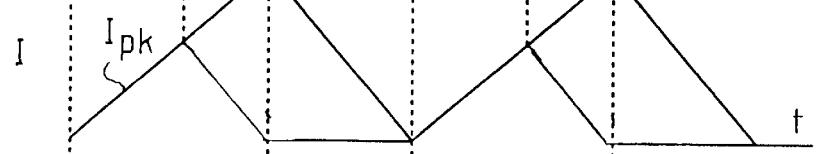
Figure 2C:
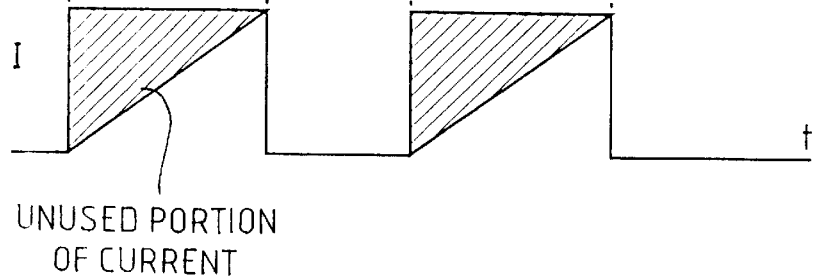
Figure 3:
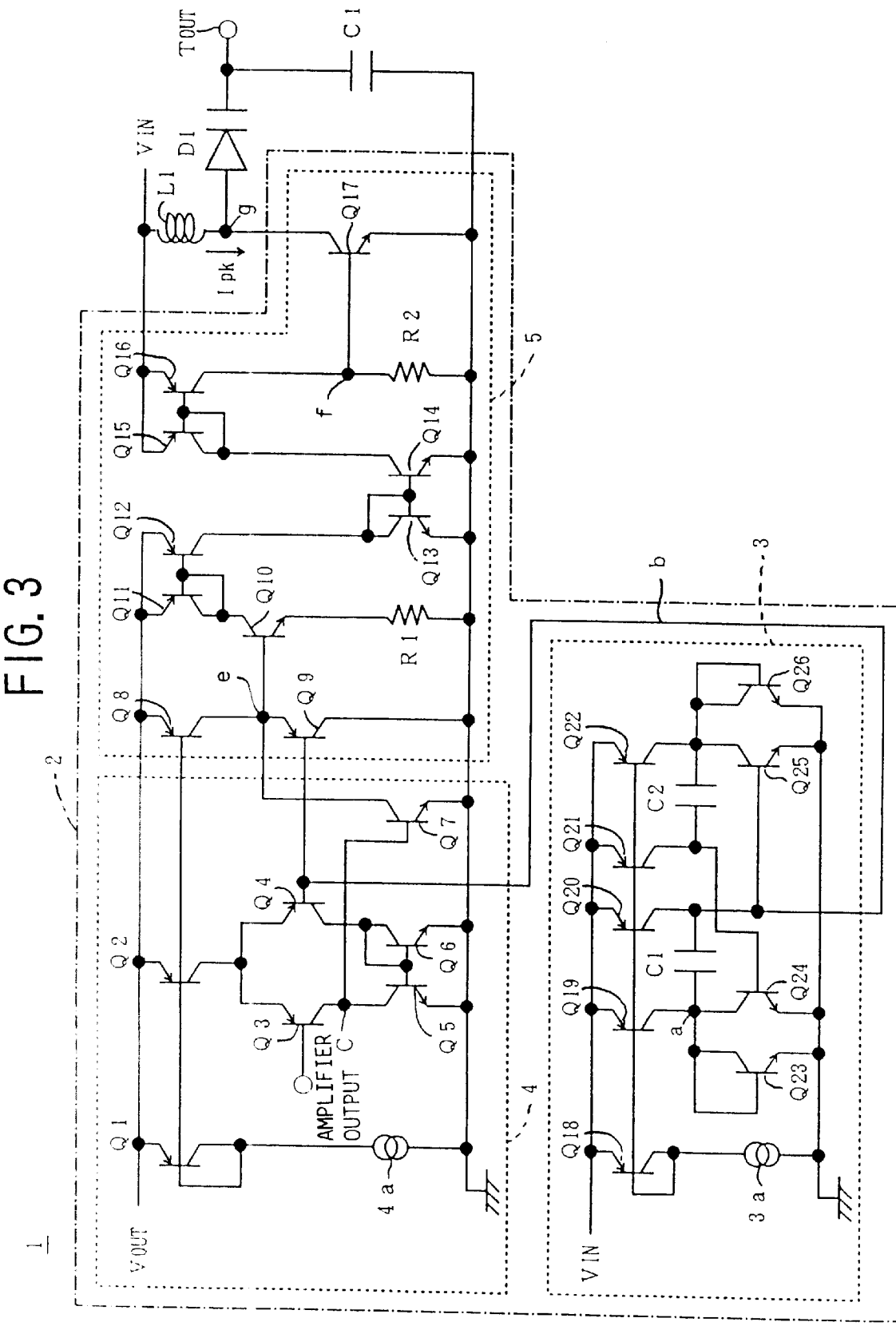
FIG. 3 is a circuit diagram of a switching regulator according to an embodiment of the present invention.

FIG. 3 is a circuit diagram of a step-up switching regulator 1 according to an embodiment of the present invention.

The switching regulator 1 comprises a drive circuit 2 for generating a triangular drive signal, a coil L1 driven by the triangular drive signal generated by the drive circuit 2 so as to output a current $I_{pk}$, a diode D1 for blocking a reverse current from a load to the coil L1, and a capacitor C1 for smoothing the output current $I_{pk}$ from the coil L1.

The drive circuit 2 comprises an oscillation circuit 3 for generating a triangular waveform having a predetermined period, a comparator 4 for comparing the triangular waveform generated by the oscillation circuit 3 with a voltage control signal commensurate with the voltage to be output so as to generate a pulse signal that rises to a high level or falls to a low level depending on a result of the comparison, and a driving circuit 5 for driving the coil L1 in accordance with the drive signal generated by the comparator 4.

The oscillation circuit 3 comprises PNP transistors Q18, Q19, Q20, Q21 and Q22 which constitute a current mirror circuit together with current sources 3a and 3b, capacitors C1, C2, and NPN transistors Q23, Q24, Q25 and Q26 for controlling charging and discharging of the capacitors C1 and C2.

The oscillation circuit 3 is driven by an input voltage $V_{IN}$. The current mirror circuit composed of the PNP transistors Q18, Q19, Q20, Q21, Q22, and the current sources 3a, 3b generates a predetermined current from the input voltage $V_{IN}$ and supplies the current to the capacitors C1 and C2. The PNP transistors Q23, Q24 and PNP transistors Q25 and Q26 are switched in accordance with a voltage charged in the capacitors C1 and C2 so as to control a pulse-like voltage that occurs at one end of the capacitors C1 and C2.

The capacitors C1 and C2 generate at the other end a voltage having a sawtooth waveform that depends on the pulse-like variation of the voltage at the one end. The sawtooth voltage generated at the other end of the capacitor C1 is supplied to the comparator 4 as an output oscillation signal and is also supplied to the base of the NPN transistor Q25 for controlling charging and discharging of the capacitor C2.

The sawtooth voltage generated at the other end of the capacitor C2 is supplied to the base of the NPN transistor Q24 for controlling charging and discharge of the capacitor C1. As a result, the sawtooth voltage of the capacitor C1 controls charging and discharging of the capacitor C2 and the sawtooth voltage of the capacitor C2 controls charging and discharging of the capacitor C1 so that oscillation occurs.

The comparator 4 corresponds to comparing means and is driven by a current source 4a and an output voltage $V_{OUT}$. The comparator 4 comprises PNP transistors Q1 and Q2 that constitute a current mirror circuit together with the current source 4a, PNP transistors Q3 and Q4 that constitute an input transistor for receiving compared signals, NPN transistors Q5 and Q6 that constitute a constant-current source, and an NPN transistor Q7 that constitutes an output transistor for outputting a result of the comparison. A voltage control signal commensurate with the level of the output voltage is supplied to the base of the PNP transistor Q3 that constitutes the input transistor and the sawtooth oscillation signal obtained in the oscillation circuit 3 is supplied to the base of the PNP transistor Q4 that constitute the input transistor.

The comparator 4 operates such that, when the oscillation signal from the oscillation circuit 3 is smaller than the voltage control signal, the PNP transistor Q4 is on and the PNP transistor Q3 is off, so that the base of the NPN transistor Q7 that constitutes the output transistor goes low so that the NPN transistor Q7 is off and the collector of the NPN transistor Q7 is open. When the oscillation signal from the oscillation circuit 3 is larger than the voltage control signal, the PNP transistor Q4 is off and the PNP transistor Q3 is on, so that the base of the NPN transistor Q7 that constitutes the output transistor goes high so that the NPN transistor Q7 is on and the collector of the NPN transistor Q7 is short-circuited.

The collector of the NPN transistor Q7 at the output of the comparator 4 is connected to the driving circuit 5 so as to control the current level in accordance with the sawtooth oscillation signal supplied by the oscillation circuit 3.

The driving circuit 5 is provided to drive the coil L1 in accordance with a driving signal generated by the comparator 4. The driving circuit 5 is driven by an input voltage $V_{IN}$ and comprises a PNP transistor Q8 that constitutes the current mirror circuit together with the current source 4a, the PNP transistors Q1 and Q2 of the comparator 4, a PNP transistor Q9 having an emitter connected to the collector of the output NPN transistor Q7 of the comparator 4 and to the collector of the PNP transistor Q8 so as to control a current in accordance with the oscillation signal from the oscillation circuit 3, an NPN transistor Q10 that constitutes a voltage-current converting circuit for converting a voltage at a junction e between the collector of the PNP transistor Q8 and the emitter of the PNP transistor Q9 into a current, a resistance R1, PNP transistors Q11, Q12, Q13, Q14, Q15 and Q16, a resistance R2 connected to the collector of the PNP transistor Q16 so as to speed up switching of the transistor Q17 and prevent a leak current therein, and an NPN transistor Q17 having a base connected to a junction f between the collector of the PNP transistor Q16 and the resistance R2 so as to drive a current in the coil L1 in accordance with the base current.

The output oscillation signal supplied from the oscillation circuit 3 is supplied to the base of the PNP transistor Q9. The constant current is supplied from the PNP transistor Q8 to the emitter of the PNP transistor Q9. As the oscillation signal increases in voltage, the emitter voltage of the PNP transistor Q9 increases and the base voltage of the NPN transistor Q10 increases.

The collector of the NPN transistor Q7 which outputs the result of the comparison at the comparator 4 is connected to the emitter of the PNP transistor Q9. Since the NPN transistor Q7 is off when the oscillation signal from the oscillation circuit 3 is smaller than the voltage control signal, the base of the NPN transistor Q10 is controlled by the PNP transistor Q9 to increase in response to the increase of the oscillation signal. When the oscillation signal from the oscillation circuit 3 becomes larger than the voltage control signal so that the NPN transistor Q7 is on, the base voltage of the NPN transistor Q10 goes low.

The collector current of the NPN transistor Q10 is controlled in accordance with the voltage at the junction e so as to control the base voltage of the PNP transistors Q11 and Q12 driven by the output voltage $V_{OUT}$. The PNP transistor Q12 controls the collector current in accordance with the collector current of the NPN transistor Q10. The collector of the PNP transistor Q12 is connected to the collector and the base of the NPN transistor Q13 and to the base of the NPN transistor Q14 so as to control the collector current of the NPN transistor Q13 and Q14.

The collector of the NPN transistor Q14 is connected to the base and the collector of the PNP transistor Q15 driven by the input voltage $V_{IN}$ and is also connected to the base of the PNP transistor Q16 so as to draw a current from the base of the PNP transistors Q15 and Q16 in accordance with the collector current of the PNP transistor Q12. The collector of the PNP transistor Q16 is connected to the resistance R2 so as to supply a current to the base of the transistor Q7 in accordance with the collector current of the NPN transistor Q14.

A sawtooth current commensurate with the output oscillation signal supplied by the oscillation circuit 3 is generated at the junction f between the PNP transistor Q16 and the resistance R2 in accordance with the collector current of the NPN transistor Q14.

The junction f between the PNP transistor Q16 and the resistance R2 is connected to the base of the NPN transistor Q17. The collector of the NPN transistor Q17 is connected to the coil L1. The NPN transistor Q17 draws a current from the coil L1 so as to control the current $I_{pk}$ flowing through the coil L1.

The coil L1 transforms the sawtooth collector current of the NPN transistor Q14 to give it a linear waveform and outputs a current at a junction g between the coil L1 and the collector of the NPN transistor Q17. The junction g between the coil L1 and the collector of the NPN transistor Q17 is connected to the output terminal $T_{OUT}$ via the diode D1. That is, when the transistor Q17 stops the current in the coil L1, a back pulse voltage is generated in the coil L1, which back pulse voltage is rectified by the diode D1 and output as the output voltage. The output terminal $T_{OUT}$ is connected to the capacitor C1.

The diode D1 blocks a reverse current from the load connected to the output terminal $T_{OUT}$. The output from the diode D1 is smoothed by the capacitor C1 so as to be output as a dc output voltage $V_{OUT}$ A description will now be given of waveforms associated with the operation.

FIGS. 4A–4E are waveform charts according to the embodiment of the present invention. FIG. 4A shows a waveform at a junction a in the oscillation circuit 3; FIG. 4B shows a waveform of a oscillation signal b of the oscillation circuit 3; FIG. 4C shows a waveform of a voltage at a junction c applied to the base of the NPN transistor Q7 of the comparator 4; FIG. 4D shows a waveform at a junction e in the driving circuit 5; and FIG. 4E shows a waveform of a current in the coil L1 occurring at the junction g.

In the oscillation circuit 3, the PNP transistors Q23 and Q24 are switched so that a pulse-like voltage as shown in FIG. 4A is supplied to one end of the capacitor C1. A sawtooth signal as shown in FIG. 4B is generated at the other end of the capacitor C1 responsive to the pulse-like voltage supplied to the one end.

The sawtooth signal as shown in FIG. 4B and generated in the oscillation circuit 3 is supplied to the comparator 4 and the driving circuit 5. The comparator 4 compares the sawtooth oscillation signal as shown in FIG. 4B with the voltage control signal. For example, referring to FIG. 4B, when the voltage control signal is at a level L1, the oscillation signal reaches the level L1 at time t1 when a time T1, which started at time t0 has elapsed. As shown in FIG. 4C, the base potential of the NPN transistor Q7 is maintained low for the time T1 and goes high at time t1. Referring also to FIG. 4B, when the voltage control signal is at a level L2, the oscillation signal reaches the level L2 at time t2 when a time T2, which started at time t0 has elapsed. As shown in FIG. 4C, the base potential of the output NPN transistor Q7 is maintained low for the time T2 and goes high at time t2.

A voltage commensurate with the oscillation signal b supplied by the oscillation circuit 3 is supplied to the junction e in the driving circuit 5. When the base potential of the NPN transistor Q7 shown in FIG. 4C goes high, the NPN transistor Q7 is forced to go low so that, as shown in FIG. 4D, a sawtooth signal which is an extraction of the sawtooth oscillation signal of FIG. 4B at the level L1 or L2 is generated.

The driving circuit 5 is controlled in accordance with the sawtooth signal as shown in FIG. 4D so that a current in the coil L1 is controlled accordingly. The current $I_{pk}$ flowing through the coil L1 is triangular as shown in FIG. 4E. The triangular signal as shown in FIG. 4E is rectified by the diode D1, smoothed by the capacitor C1 and output from the output terminal $T_{OUT}$.

As described above, the driving circuit 5 is driven by a signal having a sawtooth waveform, resulting in less current consumption than when it is driven by a signal having a rectangular waveform.

The drive signal generated by the drive circuit according to the present invention is triangular which is substantially identical to the waveform of an output current smoothed by the coil. In this way, it is possible to reduce current loss in the drive circuit so that power consumption is reduced.

The present invention is not limited to the above-described embodiment and variations and modifications may be made without departing from the scope of the present invention.

What is claimed is:

1. A switching regulator comprising a coil for controlling an output current; a drive circuit for generating a drive signal commensurate with a voltage to be output; and a switching element switched in accordance with the drive signal so as to control the output current in said coil, wherein said drive signal generated by said drive circuit has a triangular waveform; and said drive circuit comprises an oscillation circuit for generating a triangular-waveform signal having a predetermined frequency; a comparing circuit for comparing the level of the triangular-waveform signal generated by said oscillation circuit with the level of a voltage control signal commensurate with the voltage to be output; and a driving circuit for selecting a portion of the triangular-waveform signal generated by said oscillation circuit responsive to a result of comparison of said comparing circuit, so as to generate the drive signal for switching said switching element.

2. The switching regulator as claimed in claim 1, wherein said comparing circuit generates a pulse signal having one of a low level and a high level depending on the result of comparison; and said driving circuit selects the portion of the triangular-waveform signal responsive to the pulse signal generated by said comparing circuit.

3. The switching regulator as claimed in claim 2, wherein the pulse signal generated by said comparing circuit has the low level when the level of the triangular-waveform signal is lower than the level of the voltage control signal and has the high level when the level of the triangular-waveform signal is higher than the level of the voltage control signal; and the driving circuit selects the portion of the triangular-waveform signal, during which portion the pulse signal generated by said comparing circuit has the low level.

* * * * *